June 25, 1929.  C. O. PREST  1,718,834
AIRPLANE
Filed Aug. 22, 1928
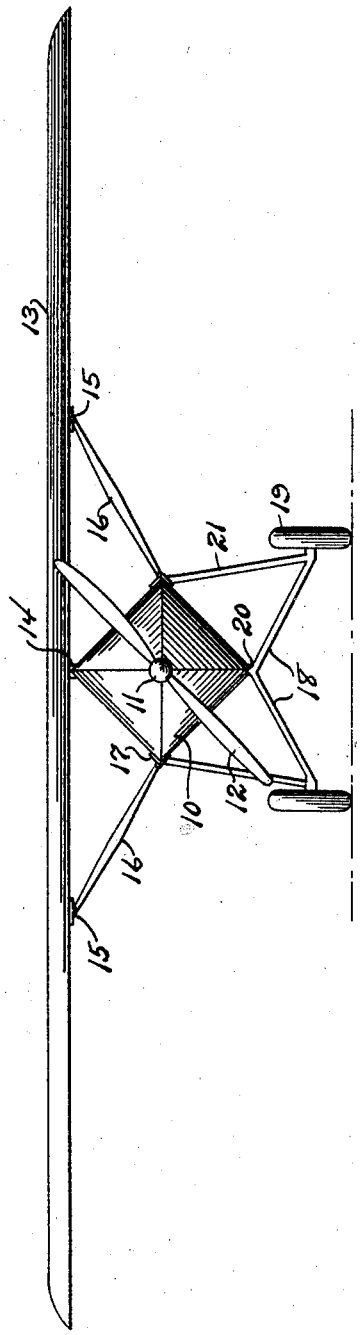
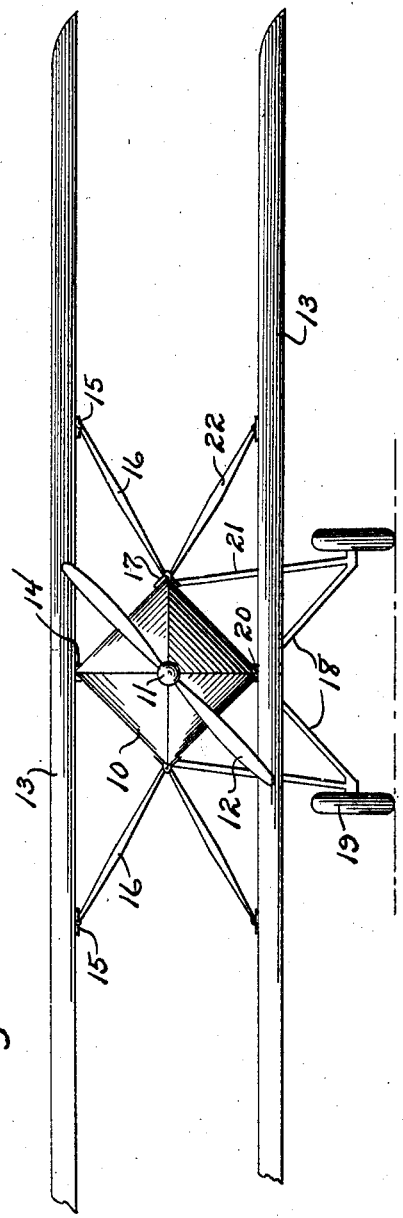
Clarence O. Prest
INVENTOR Patented June 25, 1929.

1,718,834

UNITED STATES PATENT OFFICE.

CLARENCE O. PREST, OF ARLINGTON, CALIFORNIA.

AIRPLANE.

Application filed August 22, 1928. Serial No. 301,345.

This invention relates to airplane construction and which embodies among other characteristics means for securing the wings upon the fuselage therefor.

Another object of the invention consists in the manufacture of the forward portion of the fuselage of rectangular formation, whereby exceptionally good vision may be attained inasmuch as the conventional uppermost curved sides are obviated.

An additional object of the invention comprehends brace members having connection at their ends with the corner portions of the fuselage and the adjacent portions of the wings, wheels and other equipage upon the various types of aircraft.

With the above and other objects in view, the invention further consists in the following novel features and details of construction, to be hereinafter more fully described, illustrated in the accompanying drawing and pointed out in the appended claim.

In the drawing:—

Figure 1 is a front elevation of a monoplane embodying the present invention.

Figure 2 is a view similar to Figure 1 of a biplane.

Referring to the drawing in detail, wherein like characters of reference denote corresponding parts, the reference character 10 indicates generally a fuselage, preferably rectangular in cross section, and having its corners upon the outer side edges thereof disposed in diametrically opposed relation in vertical and horizontal planes. The forward end of the fuselage is tapered and terminates in size equivalent to that of the hub 11 of a propeller blade 12.

In both monoplane and biplane construction, the upper wings 13 are adapted to be supported upon the undersides thereof and at intermediate points in their lengths upon saddle plates 14 carried upon the uppermost vertically disposed corner of the fuselage.

Anchorage plates 15, carried upon the undersides of the wing 13 and upon the opposite sides of the fuselage, are adapted for connection with brace rods 16. Angle plates 17, carried upon the outer sides of the fuselage at the horizontally disposed corners thereof, are adapted for connection with the adjacent ends of the brace rods 16.

Struts 18, carrying the landing gear 19, terminate to provide at the junctures of association of inwardly and upwardly directed end portions a saddle plate 20 engageable with the lowermost vertically disposed corner of the fuselage. Uprights 21 are adapted to establish means of connection between the struts 18 and the angle plates 17, whereby strain from the landing gear 19 will be relieved from the lowermost disposed corner of the fuselage and distributed to the horizontally disposed corners, whereby injury to the struts and landing gear will be obviated, inasmuch as the strain will be distributed to other points of suspension.

Such construction applies to both monoplanes and biplanes, but in the latter instance an additional wing, such as indicated at 13′, is employed and which is adapted for connection with the lowermost vertically disposed corner in a similar manner to that of the wing 13 and additional brace bars 22 connected with the upper side thereof in a manner similar to that of the brace rods 16 upon the wing 13. The angle plates 17 provide a common fastening for both the brace rods 16 and 22 respectively.

The aforementioned construction will support wings and landing gear in a more simplified, balanced, stronger and effective manner and yet facilitate disposition of the fuselage in such manner that the pilot may view his course from either side thereof.

Furthermore the relative arrangement of the struts, braces and rods will give to a certain degree, whereby the fuselage construction will be rendered flexible in order that the same may not become wrecked when flying through storms or when taxying over uneven runways.

The invention is susceptible of various changes in its form, proportions and minor details of construction, and the right is herein reserved to make such changes as properly fall within the scope of the appended claim.

Having thus described the invention, what is claimed is:—

A plane fuselage construction having a rectangular cross section and disposing the corners thereof in vertical and horizontal planes, saddle plates carried upon the vertical corners having connection with the intermediate portions of wings and landing gear struts, angle plates carried upon the horizontal corners, uprights establishing means of connection between the landing gear struts and angle plates, and brace rods also having connection with the angle plates being adapted for connection with the adjacent sides of the wings at remote points from the saddle plate connections therefor.

CLARENCE O. PREST.